March 30, 1926.  N. SMITH ET AL  1,578,477
SHEET ROCK CUTTER
Filed July 11, 1925  2 Sheets-Sheet 2
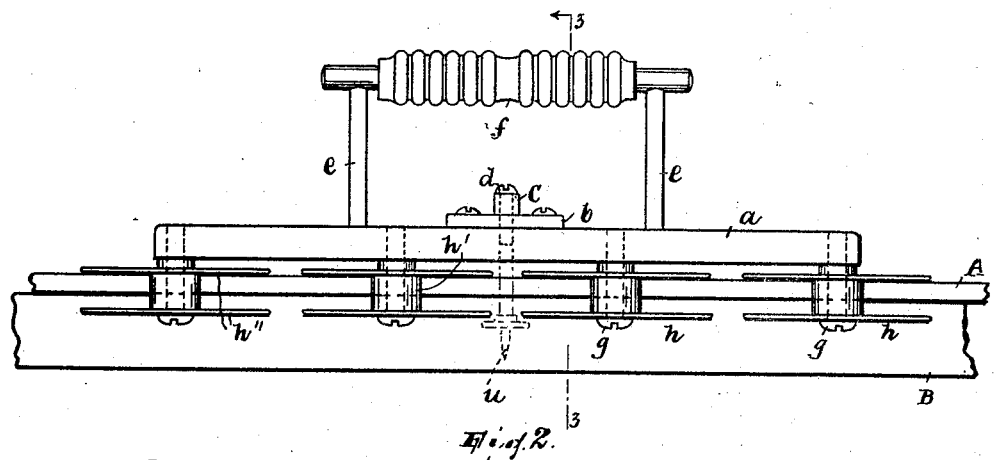
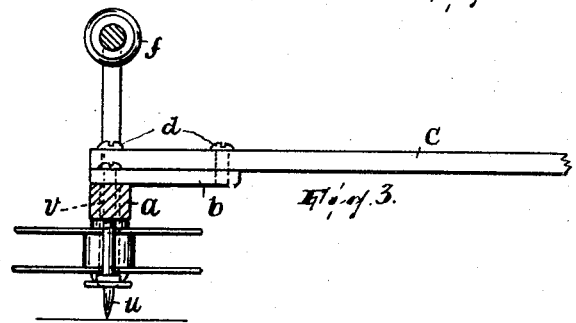
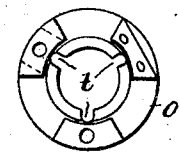
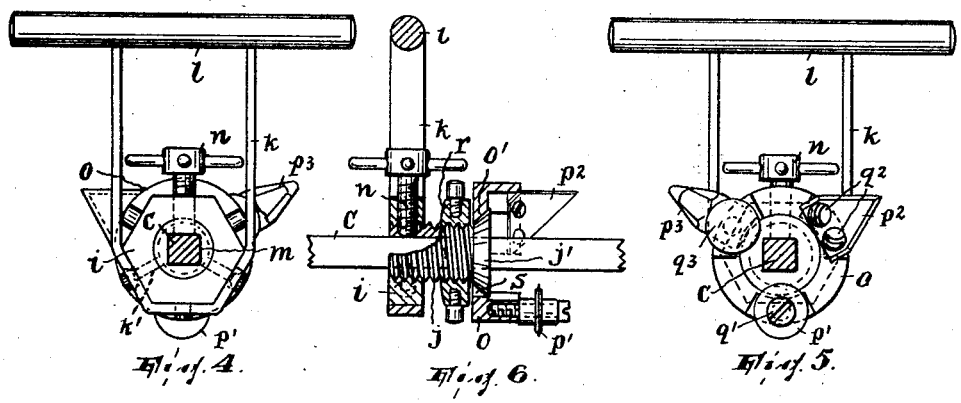
WITNESS
Wm L Bell
INVENTOR,
N. Smith
and F. W. Gallagher,
BY
John Leonard
ATTORNEY Patented Mar. 30, 1926.

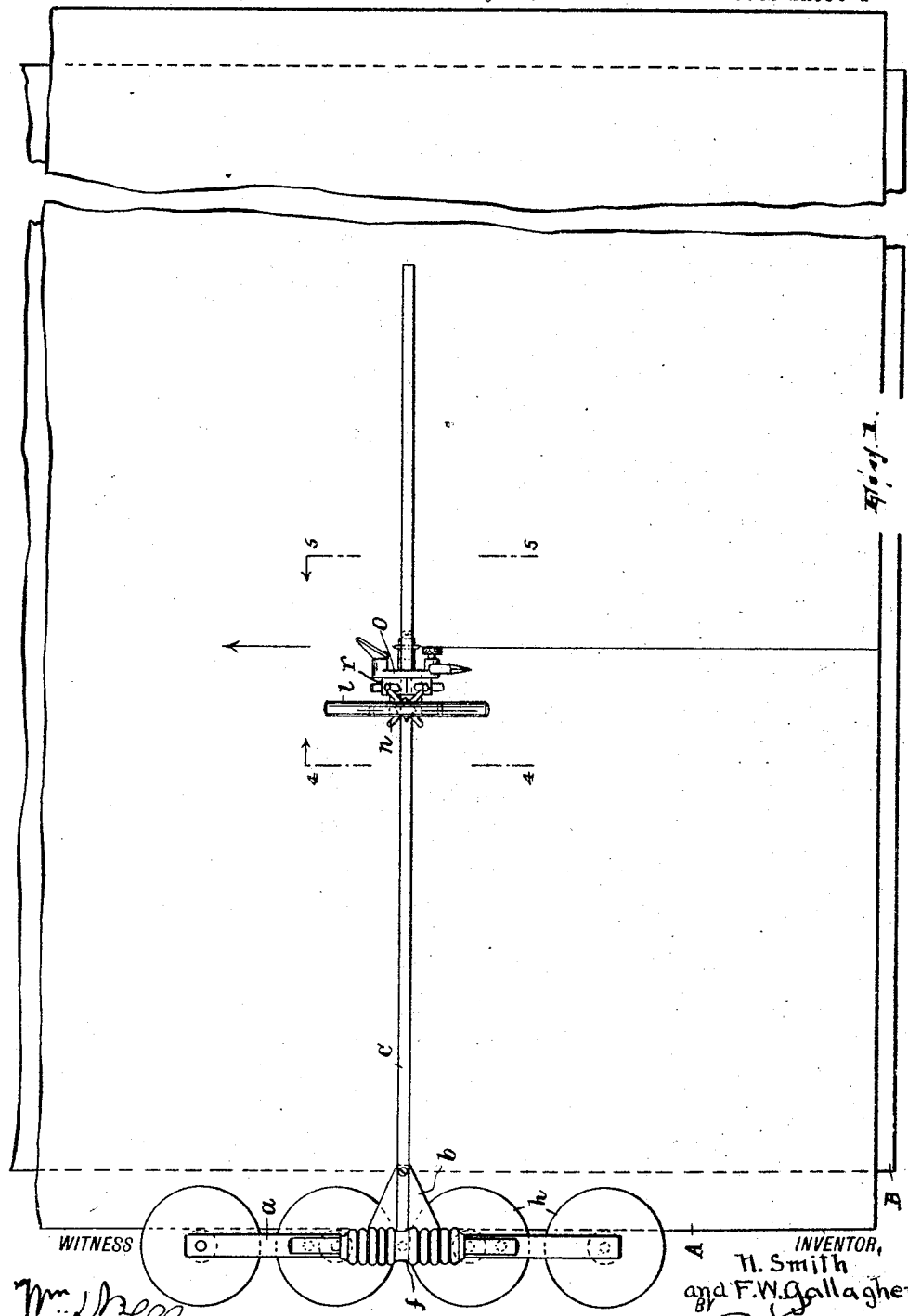

1,578,477

UNITED STATES PATENT OFFICE.

NORMAN SMITH AND FRED W. GALLAGHER, OF LINCOLN PARK, NEW JERSEY.

SHEET-ROCK CUTTER.

Application filed July 11, 1925. Serial No. 43,054.

*To all whom it may concern:*

Be it known that we, NORMAN SMITH and FRED W. GALLAGHER, subjects of King George V, residing at Lincoln Park, in the county of Morris and State of New Jersey, have invented certain new and useful Improvements in Sheet-Rock Cutters, of which the following is a specification.

This invention relates to implements for use in marking lines on and forming incisions in sheet material and it has for its principal object to provide an implement of this class which may be used with great advantage in cutting material like that known as "sheet-rock", which is a sheet of layers of plaster and paper or other fibrous material with the paper layers the exposed ones and which on account of the usual considerable size of the sheet and the brittle nature of the plaster it is difficult to cut with accuracy by any method involving first marking off the line of the cut with a pencil and then cutting the sheet along such line with a saw, using a mere rule or straight edge as a guide in the marking and cutting.

In the drawings,

Fig. 1 is a plan of the implement, showing it in operative position on a sheet of the material to be operated upon;

Fig. 2 is an elevation, viewing the implement from the base end thereof;

Fig. 3 is a section on line 3—3, Fig. 2;

Figs. 4 and 5 are sections on line 4—4 and 5—5, Fig. 1;

Fig. 6 is a sectional detail of the adjusable tool head; and

Fig. 7 shows the bushing $o$.

The frame is adapted to overlie the sheet when in use and one end portion thereof forms what may be taken as its base. In the present case this base is formed by a straight bar $a$ which has secured thereto centrally thereof a triangular plate $b$ with one apex thereof projecting laterally of the bar. The remainder of the frame is formed by another straight bar $c$ arranged perpendicularly to bar $a$ and having one end removably secured on the top of the plate by screws $d$. The bar $c$ is removable so that when not in use the frame may be knocked down for packing in smaller compass. The frame has a handle formed by two posts $e$ rigidly upstanding from the bar $a$ and a handle porper $f$ bridging them.

On vertical pivots formed by screws $g$ tapped into the under side of the bar $a$ at regular intervals lengthwise thereof and in alinement with each other are journaled a plurality of peripherally grooved wheels $h$; there are preferably two at least of these wheels at each side of the center of the bar $a$. The barrels $h'$ of these wheels are small in diameter relatively to their flanges $h''$, so that the grooves of the wheels are quite deep.

On the bar $c$ is arranged the tool-head, which in the present example comprises the following parts and which with the frame forms an adjustable supporting structure for the wheels and the tool-holder: A hexagonal block $i$ having a screw $j$ tapped into it centrally thereof and formed with a conical head $j'$; and a metal strap $k$ bent around three sides of the block and having its ends projecting upwardly and forming, with the handle proper $l$, a handle for the head, $k$ and $i$ being secured together by screws $k'$, Fig. 4. The tool-head has a hole $m$ extending therethrough axially of screw $j$, and this hole, which is of the same polygonal cross-section as bar $e$, receives the latter with a snug fit; it is adjustable toward and from the mentioned base portion of the frame and may be secured where adjusted by an upstanding thumb-screw $n$ tapped into the head in a position convenient to the hand of the operator, to wit, within the arch formed by the handle $k$—$l$. It will be understood that the screw $j$ is in effect but a threaded stem projecting from the block $i$, its threaded connection therewith having nothing to do with the normal use of the implement.

The tool-holder is formed in the present case by a bushing $o$ having a conical orifice $o'$ to receive and fit the conical head $j'$ of the screw or stem $j$, which it receives. At three equidistant points thereon it carries the tools, as a rotary cutter $p'$, whose axis is parallel with the bar $c$, a bevel cutter blade $p^2$ set at an angle to said bar $c$, and a pencil or other marker $p^3$ held in radial position in the bushing. Suitable screws $q'$, $q^2$ and $q^3$ may be used to secure the tools removably in place. The bushing is rotatably adjustable on the bearing formed by the stem or screw $j$ to bring any one of the tools into operative position (projecting downwardly, as $p'$, Fig. 5) and is held when adjusted by a nut $r$ screwed on stem $j$ and adapted to jam the bushing against the abutment formed by head $j'$ of said stem; a key or feather $s$ on the head $j'$ may at this time enter any one of three grooves $t$ in the bushing (Fig. 7) to insure the latter against turning.

In use the sheet A to be cut is laid upon a table B so that one edge projects somewhat. Then the operator places the implement on the sheet in the manner shown in Figs. 1 and 2, i. e., so that the appropriate one of the tools rests on the sheet and all the wheels receive in their grooves the projecting edge of the sheet and their barrels all bear against the same. The head having been first adjusted the desired distance from the base of the implement the operator now grasps the latter by its two handles and shifts it across the sheet; in doing so he maintains the wheels in contact with the projecting edge of the sheet and in this way obtains a mark on or cut in the sheet which is truly parallel with said edge. In cutting the mentioned sheet rock the cutter ($p'$ or $p^2$) will incise the outer paper layer, so that the sheet may then be broken on the line of cut, which will be sharply defined as well as truly parallel to the projecting or guiding edge of the sheet.

The considerable size of the sheet, the brittle nature of the plaster thereof, the fact that the edge of the sheet which serves as the guiding edge is not always without irregularities and other considerations make it desirable to provide wheels or rollers, as $h$, having grooved peripheries to receive the edge of the sheet and to provide a plurality of these on each side of the center of the base portion of the frame so as to guide the implement true when the bar $c$ (which represents its longitudinal or working axis) is beyond a corner of the sheet.

A center-point $u$ may be adapted to be set in a hole $v$ arranged centrally of bar $a$ so as to project downwardly. When this is rested on some point of the sheet the implement may be employed to form an arcuate mark on or cut in the sheet of any radius according to the adjustment of the tool-head along bar $c$.

It is an important feature of the invention that the frame is made desirably light by forming it principally of two slender bars $a$ and $c$ secured together in the form of the letter T, with the top of the T (bar A) forming the base of the frame and the upright of the T (bar $c$) forming a support for and along which the tool is adjustable, and said base having guiding means (as $h$) to bear on an edge of the sheet.

Having thus fully described our invention, what we claim and desire to obtain by Letters Patent is:

1. In an implement of the class described, the combination of a frame having a basal portion, a set of peripherally grooved freely revoluble guiding wheels arranged in alinement with each other on said portion, the frame including also another portion projecting rigidly from the basal portion in angular relation to the set of wheels, and a tool-head adjustable on the latter portion toward and from the basal portion.

2. In an implement of the class described, the combination of a frame having a basal portion, a set of peripherally grooved freely revoluble guiding wheels arranged in alinement with each other on said portion, the frame including also another portion projecting rigidly from the basal portion in angular relation to the set of wheels, and a tool-head adjustable on the latter portion toward and from the basal portion, there being a plurality of the wheels at each side of a straight line extending through the tool-head and perpendicular to the set of alined wheels.

3. In an implement of the class described, the combination, with a supporting structure including a basal portion having means to confine said structure in a definite path over the sheet to be operated upon, said structure also including a bearing whose axis projects laterally away from the basal portion, and a tool-head supported by said bearing and adjustable around said axis.

4. In an implement of the class described, the combination, with a supporting structure including a basal portion having means to confine said structure in a definite path over the sheet to be operated upon, said structure also including a bearing formed with an abutment and having its axis projecting laterally away from the basal portion, a tool-head supported by said bearing and revoluble around said axis, and a nut screwed on the bearing and adapted to jam the tool-head against the abutment.

5. In an implement of the class described, the combination, with a frame including a basal portion having means to confine the frame in a definite path over the sheet to be operated upon, said frame also including an elongated portion extending laterally away from the basal portion, a tool-head shiftable on the second-named portion toward and from the basal portion, said basal portion and tool-head having upstanding handles and the latter handle being arched, and a screw tapped into the head within the arch of said latter handle and adapted to bear against said second-named portion of the frame.

In testimony whereof we affix our signatures.

NORMAN SMITH.
FRED W. GALLAGHER.